United States Patent
Liu et al.

(10) Patent No.: US 11,015,929 B2
(45) Date of Patent: May 25, 2021

(54) POSITIONING METHOD AND APPARATUS

(71) Applicant: DONGGUAN FRONTIER TECHNOLOGY INSTITUTE, Dongguan (CN)

(72) Inventors: Ruopeng Liu, Shenzhen (CN); Lin Luan, Shenzhen (CN); Faguo Xu, Shenzhen (CN)

(73) Assignee: DONGGUAN FRONTIER TECHNOLOGY INSTITUTE, Guangdong (CN)

( * ) Notice: Subject to any disclaimer, the term of this patent is extended or adjusted under 35 U.S.C. 154(b) by 36 days.

(21) Appl. No.: 16/474,366

(22) PCT Filed: Jul. 6, 2017

(86) PCT No.: PCT/CN2017/091953
§ 371 (c)(1),
(2) Date: Jun. 27, 2019

(87) PCT Pub. No.: WO2018/120735
PCT Pub. Date: Jul. 5, 2018

(65) Prior Publication Data
US 2019/0339074 A1  Nov. 7, 2019

(30) Foreign Application Priority Data
Dec. 29, 2016 (CN) .......................... 201611270205.7

(51) Int. Cl.
*G01C 11/12* (2006.01)
*G01C 21/16* (2006.01)
*G06T 7/73* (2017.01)

(52) U.S. Cl.
CPC ............ *G01C 11/12* (2013.01); *G01C 21/165* (2013.01); *G06T 7/74* (2017.01); *G06T 2207/10032* (2013.01)

(58) Field of Classification Search
CPC ...... G01C 11/12; G01C 21/165; G01C 11/06; G01C 21/00; G06T 2207/10032;
(Continued)

(56) References Cited

U.S. PATENT DOCUMENTS 10,798,343 B2 * 10/2020 Davidson, Jr. .......... G06T 11/00
2007/0031064 A1 * 2/2007 Zhao .......................... G06T 7/33
382/285
(Continued)

FOREIGN PATENT DOCUMENTS

CN  101509782 A  8/2009
CN  101620671 A  1/2010
(Continued)

OTHER PUBLICATIONS

International Search Report for International Application No. PCT/CN2017/091953, dated Sep. 27, 2017, 2 pages.
(Continued)

*Primary Examiner* — Bobbak Safaipour
(74) *Attorney, Agent, or Firm* — Armstrong Teasdale LLP

(57) ABSTRACT

The present invention discloses a positioning method and apparatus. The method includes: acquiring a first image captured by an optical device, where the first image includes an observation object and a plurality of predetermined objects, and the predetermined objects are objects with known geographic coordinates; selecting a first predetermined object from the predetermined objects based on the first image; acquiring a second image, where the first predetermined object is located in a center of the second image; determining a first attitude angle of the optical device based on the first predetermined object in the second image and measurement data captured by an inertial navigation system; modifying the first attitude angle based on a positional relationship between the observation object and the first
(Continued)

predetermined object in the second image, to obtain a second attitude angle; and calculating geographic coordinates of the observation object based on the second attitude angle. According to the present invention, a prior-art technical problem that costs of accurately locating an observation object are high is resolved.

20 Claims, 3 Drawing Sheets

(58) Field of Classification Search
CPC .......... G06T 7/74; G06T 2207/30244; G06K 2209/21; G06K 9/0063; G06K 9/3233
See application file for complete search history.

(56) References Cited

U.S. PATENT DOCUMENTS

| | | |
|---|---|---|
| 2008/0074639 A1 | 3/2008 | Donoghue et al. |
| 2009/0326816 A1 | 12/2009 | Park et al. |
| 2011/0122257 A1 | 5/2011 | Kirk |
| 2014/0376821 A1 | 12/2014 | Meir et al. |

FOREIGN PATENT DOCUMENTS

| | | |
|---|---|---|
| CN | 101750067 A | 6/2010 |
| CN | 101793517 B | 5/2012 |
| CN | 202928582 U | 5/2013 |
| CN | 103424114 A | 12/2013 |
| CN | 103557871 A | 2/2014 |
| CN | 103674021 A | 3/2014 |
| CN | 103914855 A | 7/2014 |
| CN | 105222788 A | 1/2016 |
| CN | 105549060 A | 5/2016 |
| CN | 105761242 A | 7/2016 |
| WO | 2015081424 A1 | 6/2015 |

OTHER PUBLICATIONS

EESR for corresponding European Patent Application No. 17888044.9, dated Jul. 9, 2020, 10 pages.

\* cited by examiner

POSITIONING METHOD AND APPARATUS

CROSS-REFERENCE TO RELATED APPLICATIONS

This application is the national stage entry of PCT/CN2017/091953, filed on Jul. 6, 2017, which claims the benefit of priority to Chinese Patent Application No. 201611270205.7, filed Dec. 29, 2016, which are incorporated by reference in their entirety herein.

TECHNICAL FIELD

The present invention relates to the surveying and mapping field, and in particular, to a positioning method and apparatus.

BACKGROUND

In the prior art, the positioning of an observation object by a floating platform requires that a high-precision inertial navigation system is fixed on the pan/tilt axis of an optical device to obtain an attitude, and the positioning of the observation object is completed by combining a high-precision ranging device.

However, the completion of the positioning of the observation object through this solution requires a relatively large hardware cost, and also requires a large hardware upgrade and transformation of the existing platform that has been put into use. Therefore, practicability is relatively low.

The attitude is obtained by fixing the high-precision inertial navigation system on the stable pan/tilt axis inside the optical device, and the positioning operation is completed by combining the high-precision ranging device.

In view of the above-mentioned high cost of accurately locating the observation object, no effective solution is currently proposed.

SUMMARY

According to one aspect of the present invention, a positioning method is provided, the positioning method comprising:
acquiring a first image captured by an optical device; the first image comprising images of an observation object and a plurality of predetermined objects, and the predetermined objects having known geographic coordinates;
selecting a first predetermined object from the predetermined objects based on the first image;
acquiring a second image; the first predetermined object being located at the center of the second image;
determining a first attitude angle of the optical device based on measurement data obtained by an inertial navigation system and the first predetermined object in the second image;
modifying the first attitude angle, based on a position relationship between the observation object and the first predetermined object in the second image, to obtain a second attitude angle;
calculating the geographic coordinate of the observation object based on the second attitude angle.

In one embodiment, the step of acquiring a first image captured by an optical device comprises:
acquiring the first image in a target area captured by the optical device; the target area comprising the observation object and the predetermined objects, and a range of the target area being determined according to an angle of field of view of the optical device.

In one embodiment, the step of acquiring a first image captured by an optical device comprises:
detecting whether an image, captured by the optical device, comprises images of the observation object and the predetermined objects;
increasing an angle of field of view of the optical device and reacquiring the image captured by the optical device if the image captured by the optical device does not comprise images of the observation object and the predetermined objects;
determining that the first image is captured if the image captured by the optical device comprises images of the observation object and the predetermined objects.

In one embodiment, the step of detecting whether an image captured by the optical device comprises images of the observation object and the predetermined objects comprises:
obtaining a predetermined image database of the observation object and the predetermined objects, the predetermined image database storing features of the observation object and the predetermined objects;
detecting whether the image captured by the optical device comprises the features of the observation object and the predetermined objects; and
determining that the image captured by the optical device comprises images of the observation object and the predetermined objects if it is detected that the image captured by the optical device comprises the features of the observation object and the predetermined objects.

In one embodiment, the step of selecting a first predetermined object from the predetermined objects based on the first image comprises:
determining distances between the observation object and the predetermined objects in the first image; and
determining the predetermined object, having the shortest distance from the observation object, as the first predetermined object.

In one embodiment, the step of determining a first attitude angle of the optical device based on measurement data obtained by an inertial navigation system and the first predetermined object in the second image comprises:
calculating the first attitude angle of the optical device, based on the measurement data obtained by the inertial navigation system and the first predetermined object in the second image, by using a first formula; wherein the first formula is $$A \begin{bmatrix} \cos\alpha\cos\beta \\ \sin\alpha\cos\beta \\ -\sin\beta \end{bmatrix} = B \begin{bmatrix} N\cos c \cos d \\ N\cos c \sin d \\ N(1-e^2)\sin c \end{bmatrix},$$

wherein
A and B represent preset rotation matrices that are determined based on the measurement data obtained by the inertial navigation system;
c and d are geographic coordinates of the center location of the second image, c represents a longitude coordinate, and d represents a latitude coordinate;
α and β are first attitude angles at which the optical device captures the second image, α is an azimuth angle, and β is a pitch angle; and $$e = \frac{\sqrt{a^2 - b^2}}{a} \text{ and } N = \frac{a}{\sqrt{(1 - e^2 \times \sin^2 d)}},$$

wherein a represents the longest radius of the earth, and b represents the shortest radius of the earth.

In one embodiment, the step of modifying the first attitude angle, based on a position relationship between the observation object and the first predetermined object in the second image, to obtain a second attitude angle comprises:

modifying the first attitude angle, based on the position relationship between the observation object and the first predetermined object in the second image, by using a second formula to obtain the second attitude angle; wherein the second formula is $$\Delta\beta = \begin{cases} \frac{(h-540)}{1080}\xi \ldots h < 540 \\ 0 \ldots h = 540 \text{ or } 541 \\ \frac{(h-541)}{1080}\xi \ldots h > 541 \end{cases} \text{ and } \Delta\alpha = \begin{cases} \frac{(l-960)}{1920}\omega \ldots l < 960 \\ 0 \ldots l = 960 \text{ or } 961 \\ \frac{(l-961)}{1920}\omega \ldots l < 961 \end{cases},$$

wherein h is a row number of pixels of the observation object in the second image, and l is a column number of pixels of the observation object in the second image;

α and β are the first attitude angles at which the optical device captures the second image, α is an azimuth angle, and β is a pitch angle;

Δβ is a modified value of the pitch angle, and Δα is a modified value of the azimuth angle;

ξ and ω are angles of field of view at which the optical device captures the second image, ξ represents the angle of field of view of the optical device in a vertical direction, and ω represents the angle of field of view of the optical device in a horizontal direction; and β'=β−Δβ is a modified pitch angle, α'=α+Δα is a modified azimuth angle, and the second attitude angle comprises the modified pitch angle and the modified azimuth angle.

According to another aspect of the present invention, a positioning apparatus is provided, the positioning apparatus comprising:

a first acquiring unit, configured to acquire a first image captured by an optical device; wherein the first image comprises images of an observation object and a plurality of predetermined objects, and the predetermined objects have known geographic coordinates;

a first selection unit, configured to select a first predetermined object from the predetermined objects based on the first image;

a second acquiring unit, configured to acquire a second image, wherein the first predetermined object is located at the center of the second image;

a first arithmetic unit, configured to determine a first attitude angle of the optical device based on measurement data obtained by an inertial navigation system and the first predetermined object in the second image;

a second arithmetic unit, configured to modify the first attitude angle, based on a position relationship between the observation object and the first predetermined object in the second image, to obtain a second attitude angle; and a third arithmetic unit, configured to calculate the geographic coordinate of the observation object based on the second attitude angle.

In one embodiment, the first acquiring unit comprises:

a first acquiring module, configured to acquire the first image in a target area captured by the optical device; wherein the target area comprises the observation object and the predetermined objects, and a range of the target area is determined according to an angle of field of view of the optical device.

In one embodiment, the first acquiring unit comprises:

a detection module, configured to detect whether an image captured by the optical device comprises images of the observation object and the predetermined objects;

a first detection sub-module, configured to increase an angle of field of view of the optical device and reacquire the image captured by the optical device if the image captured by the optical device does not comprise images of the observation object and the predetermined objects; and a second detection sub-module, configured to determine that the first image is captured if the image captured by the optical device comprises images of the observation object and the predetermined objects.

In one embodiment, the detection module comprises:

a second acquiring module, configured to obtain a predetermined image database of the observation object and the predetermined objects, wherein the predetermined image database stores features of the observation object and the predetermined objects;

a second detection module, configured to detect whether the image captured by the optical device comprises the features of the observation object and the predetermined objects; and a third detection sub-module, configured to determine that the image captured by the optical device comprises images of the observation object and the predetermined objects if it is detected that the image captured by the optical device comprises the features of the observation object and the predetermined objects.

In one embodiment, the first selection unit is specifically configured to:

determine distances between the observation object and the predetermined objects in the first image; and determine a predetermined object, having the shortest distance from the observation object, as the first predetermined object.

In one embodiment, the first arithmetic unit is specifically configured to:

calculate the first attitude angle of the optical device, based on the measurement data obtained by the inertial navigation system and the first predetermined object in the second image, by using a first formula; wherein the first formula is $$A \begin{bmatrix} \cos\alpha\cos\beta \\ \sin\alpha\cos\beta \\ -\sin\beta \end{bmatrix} = B \begin{bmatrix} N\cos c\cos d \\ N\cos c\sin d \\ N(1-e^2)\sin c \end{bmatrix},$$

wherein

A and B represent preset rotation matrices that are determined based on the measurement data obtained by the inertial navigation system;

c and d are geographic coordinates of the center location of the second image, c represents a longitude coordinate, and d represents a latitude coordinate;

α and β are first attitude angles at which the optical device captures the second image, α is an azimuth angle, and β is a pitch angle; and $$e = \frac{\sqrt{a^2 - b^2}}{a} \text{ and } N = \frac{a}{\sqrt{(1 - e^2 \times \sin^2 d)}},$$

wherein a represents the longest radius of the earth, and b represents the shortest radius of the earth.

In one embodiment, the second arithmetic unit is specifically configured to:

modify the first attitude angle, based on the position relationship between the observation object and the first predetermined object in the second image, by using a second formula to obtain the second attitude angle; wherein the second formula is $$\Delta\beta = \begin{cases} \frac{(h-540)}{1080}\xi \ldots h < 540 \\ 0 \ldots h = 540 \text{ or } 541 \\ \frac{(h-541)}{1080}\xi \ldots h > 541 \end{cases} \text{ and } \Delta\alpha = \begin{cases} \frac{(l-960)}{1920}\omega \ldots l < 960 \\ 0 \ldots l = 960 \text{ or } 961 \\ \frac{(l-961)}{1920}\omega \ldots l < 961 \end{cases};$$

wherein h is a row number of pixels of the observation object in the second image, and l is a column number of pixels of the observation object in the second image;

α and β are the first attitude angles at which the optical device captures the second image, α is an azimuth angle, and β is a pitch angle;

Δβ is a modified value of the pitch angle, and Δα is a modified value of the azimuth angle;

ξ and ω are angles of field of view at which the optical device that captures the second image, ξ represents the angle of field of view of the optical device in a vertical direction, and ω represents the angle of field of view of the optical device in a horizontal direction; and β'=−Δβ is a modified pitch angle, α'=α+Δα is a modified azimuth angle, and the second attitude angle comprises the modified pitch angle and the modified azimuth angle.

In the embodiments of the present invention, an optical device carried on a floating platform collects an image of a target on observation ground, extracts, from the collected image, an image including an observation target and a plurality of preset targets with known geographic coordinates, and uses the image as a first image; then selects a preset target from the first image, uses the preset target as a reference target for accurately locating the observation target subsequently, and names the reference target as a first preset target; then selects, from the first image, a second image in which the first preset target is located in an image center, determines, based on known coordinates of the first preset target and measurement data collected by an inertial navigation system of the floating platform, a first attitude angle of the optical device for collecting the second image; then modifies the first attitude angle based on a location relationship between the observation target and the first preset target in the second image, to obtain a second attitude angle; and further calculates geographic coordinates of the observation target based on the modified second attitude angle, so that the floating platform can accurately locate the observation target based on the optical device of the floating platform, the inertial navigation system of the floating platform, and the preset target on the ground, without a need of additionally adding a ranging module and an attitude determination module to locate the observation target, thereby resolving a prior-art technical problem that costs of accurately locating an observation target are high.

BRIEF DESCRIPTION OF DRAWINGS

The drawings described herein provide further understanding of the present invention, and form a part of this application. Schematic embodiments of the present invention and descriptions thereof are used to explain the present invention but do not constitute an inappropriate limitation on the present invention. In the drawings.

DESCRIPTION OF EMBODIMENTS

Figure 1:
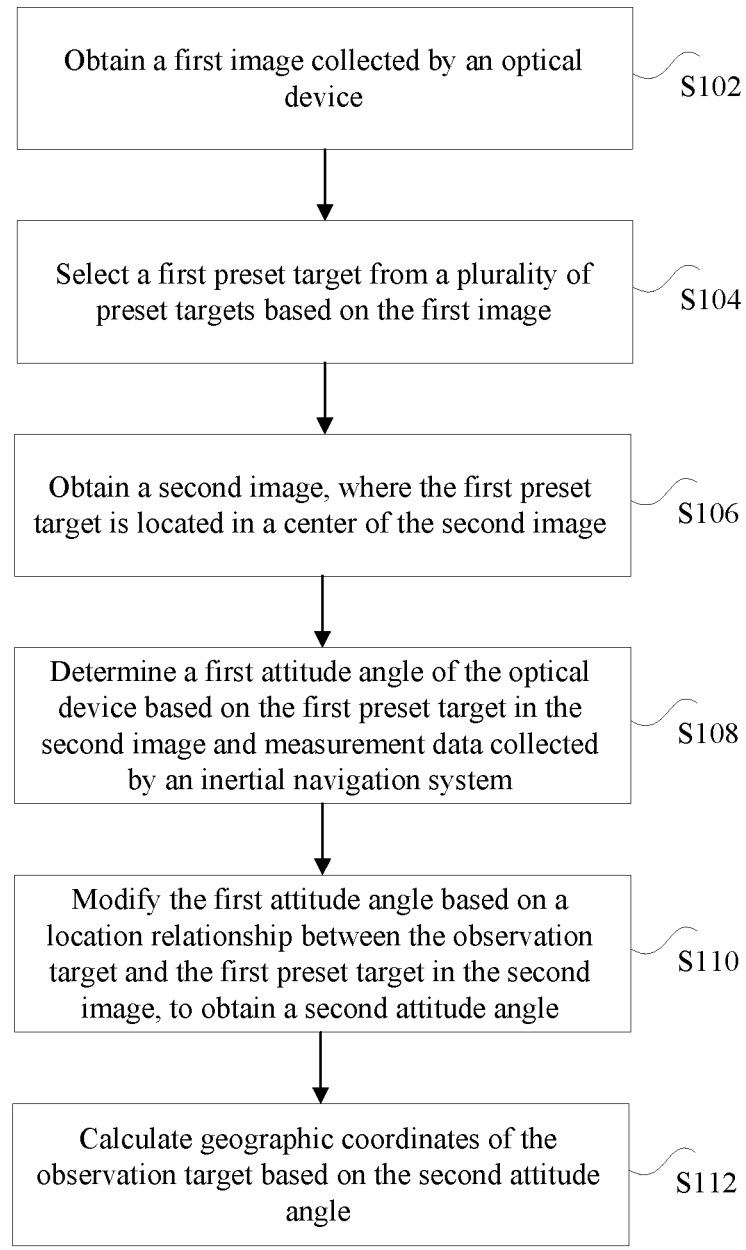
FIG. 1 is a flowchart of a positioning method according to an embodiment of the present invention.

FIG. 1 is a flowchart of a positioning method according to an embodiment of the present invention. As shown in FIG. 1, the positioning method includes the following steps:

Step S102: acquiring a first image captured by an optical device; wherein the first image includes images of an observation object and a plurality of predetermined objects, and the predetermined objects have known geographic coordinates.

Step S104: selecting a first predetermined object from the predetermined objects based on the first image.

Step S106: acquiring a second image; wherein the first predetermined object is located at the center of the second image.

Step S108: determining a first attitude angle of the optical device based on measurement data obtained by an inertial navigation system and the first predetermined object in the second image.

Step S110: modifying the first attitude angle, based on a position relationship between the observation object and the first predetermined object in the second image, to obtain a second attitude angle.

Step S112: calculating the geographic coordinate of the observation object based on the second attitude angle.

In the above embodiment, the optical device mounted on the floating platform captures an image of the ground observation object, extracts an image, including the observation object and the predetermined objects that have known geographic coordinates, from the captured image; and determines the extracted image as a first image; then selects a predetermined object from the first image, determines the predetermined object as a reference object for accurately positioning the observation object subsequently, and names the reference object as the first predetermined object; then selects a second image from the first image, wherein the first predetermined object is located at the center of the second image; determines a first attitude angle at which the optical device captures the second image, based on known coordinates of the first predetermined object and measurement data obtained by the inertial navigation system of the floating platform; then modifies the first attitude angle, based on a position relationship between the observation object and the first predetermined object in the second image, to obtain a second attitude angle; and further calculates geographic coordinate of the observation object based on the modified second attitude angle, such that the floating platform allows accurate positioning of the observation object based on the optical device of the floating platform, the inertial navigation system of the floating platform, and the predetermined object on the ground, without the need to additionally add a distance measuring module and an attitude measuring module to the floating platform so as to facilitate positioning the observation object, thereby solving the technical problem that the cost of accurate positioning of the observation object is high in the prior art.

It should be noted that the inertial navigation system is an autonomous navigation system that does not rely on external information and does not radiate energy to the outside. An estimating navigation manner is used, that is, self position coordinates are calculated based on a position of a known point and its own motion state.

In an optional embodiment, the step of acquiring a first image captured by an optical device includes: acquiring the first image in a target area captured by the optical device; wherein the target area includes the observation object and the predetermined objects, and a range of the target area is determined according to an angle of field of view of the optical device.

Optionally, the target area is determined by manually selecting the observation object as a center, and a plurality of predetermined objects are uniformly disposed in the target area, such that the optical device can more easily capture the first image that includes images of the observation object and the predetermined object.

Optionally, the target area may be determined based on the angle of field of view of the optical device. A range of an adjustable angle of field of view of the optical device and a flying height of the floating platform are obtained in advance. Such that a range of a ground image captured by the floating platform during flight may be determined, and then the target area is determined based on the range.

It should be noted that, in the current imaging state, the angle of field of view represents an image coverage area relative to a field angle of the optical device. For a zoom optical system, the angle of field of view changes only with the adjustment of the local length while ensuring that other optical parameters are unchanged.

In an optional embodiment, the step of acquiring a first image captured by an optical device includes: detecting whether an image, captured by the optical device, includes the observation object and the predetermined objects; increasing an angle of field of view of the optical device and reacquiring the image captured by the optical device if the image captured by the optical device does not include images of the observation object and the predetermined objects; or determining that the first image is captured if the image captured by the optical device includes images of the observation object and the predetermined objects.

Optionally, the angle of field of view of the optical device is expanded to expand the range of captured images, such that the first image can be obtained without changing the position of the floating platform and the attitude angle of the optical device.

In an optional embodiment, the step of detecting whether the image captured by the optical device includes images of the observation object and the predetermined objects includes: obtaining a predetermined image database, the predetermined image database storing features of the observation object and the predetermined objects; detecting whether the image captured by the optical device includes the features of the observation object and the predetermined objects; and determining that the image captured by the optical device includes images of the observation object and the predetermined objects if it is detected that the image captured by the optical device includes the features of the observation object and the predetermined objects.

Specifically, the image captured by the optical device may be compared with the image database in which the observation object and the predetermined objects are stored in advance, and the image captured by the optical device including images of the observation object and the predetermined objects may be determined.

In an optional embodiment, the step of selecting a first predetermined object from the predetermined objects based on the first image includes: determining distances between the observation object and the predetermined objects in the first image; and determining the predetermined object, having the shortest distance from the observation object, as the first predetermined object. Coordinates of the predetermined object closest to the observation object are obtained and used as parameters of subsequent operation, so as to facilitate operation.

In an optional embodiment, the step of determining a first attitude angle of the optical device based on measurement data obtained by an inertial navigation system and the first predetermined object in the second image includes: calculating, by using a first formula, the first attitude angle of the optical device based on measurement data obtained by an inertial navigation system and the first predetermined object in the second image, where the first formula is $$A\begin{bmatrix}\cos\alpha\cos\beta\\ \sin\alpha\cos\beta\\ -\sin\beta\end{bmatrix}=B\begin{bmatrix}N\cos c\cos d\\ N\cos c\sin d\\ N(1-e^2)\sin c\end{bmatrix},$$

where A and B represent preset rotation matrices that are determined based on the measurement data obtained by the inertial navigation system; c and d are geographic coordinates of the center location of the second image, c represents a longitude coordinate, and d represents a latitude coordinate; α and β are first attitude angles at which the optical device captures the second image, α is an azimuth angle, and β is a pitch angle; and $$e=\frac{\sqrt{a^2-b^2}}{a} \text{ and } N=\frac{a}{\sqrt{(1-e^2\times\sin^2 d)}},$$

where a represents the longest radius of the earth, and b represents the shortest radius of the earth.

It should be noted that a represents the longest radius of the earth and a=6378137 m and b represents the shortest radius of the earth and b=6356752.3142 m.

Specifically, based on geographic coordinate of the first predetermined object in the second image and the measurement data obtained by the inertial navigation system of the floating platform, the first attitude angle at which the optical device captures the second image may be calculated by using the first formula, and data of the first attitude angle may be used in a subsequent calculation process. A correspondence between the attitude angle at which the optical device captures the second image and the geographic coordinates of the center location of the second image is established based on the first formula. The first attitude angle of the second image may be calculated according to the known geographic coordinate of the first predetermined object in the center location of the second image.

It should be noted that the direction in which the optical device captures the image may be represented by a direction line from the optical device to the center direction of the captured image. The optical device may rotate around a certain fixed point during the process of capturing the image. The rotation direction includes a horizontal direction and a vertical direction. In order to accurately express the direction in which the optical device captures the image, the concept of the attitude angle is used. The attitude angle includes an azimuth angle and a pitch angle. The azimuth angle represents the horizontal included angle between the direction line of the optical device and the north direction, and the azimuth angle increases as the direction line rotates clockwise around the fixed point. The pitch angle represents an angle between the direction line of the optical device and the horizontal direction. If the direction line is above the horizontal direction, the pitch angle is positive; or if the direction line is below the horizontal direction, the pitch angle is negative.

In an optional embodiment, the step of modifying the first attitude angle, based on a position relationship between the observation object and the first predetermined object in the second image, to obtain a second attitude angle includes: modifying, by using a second formula, the first attitude angle based on the position relationship between the observation object and the first predetermined object in the second image, to obtain the second attitude angle, where the second formula is $$\Delta\beta = \begin{cases} \frac{(h-540)}{1080}\xi & \dots h < 540 \\ 0 & \dots h = 540 \, or \, 541 \\ \frac{(h-541)}{1080}\xi & \dots h > 541 \end{cases} \quad \text{and} \quad \Delta\alpha = \begin{cases} \frac{(l-960)}{1920}\omega & \dots l < 960 \\ 0 & \dots l = 960 \, or \, 961 \\ \frac{(l-961)}{1920}\omega & \dots l > 961 \end{cases},$$

where h is a row number of pixels of the observation object in the second image, and l is a column number of pixels of the observation object in the second image; $\alpha$ and $\beta$ are first attitude angles at which the optical device captures the second image, $\alpha$ is an azimuth angle, and $\beta$ is a pitch angle; $\Delta\beta$ is a modified value of the pitch angle, and $\Delta\alpha$ is a modified value of the azimuth angle; $\xi$ and $\omega$ are angles of field of view at which the optical device captures the second image, $\xi$ represents the angle of field of view of the optical device in a vertical direction, and $\omega$ represents the angle of field of view of the optical device in a horizontal direction; and $\beta'=\beta-\Delta\beta$ is a modified pitch angle, $\alpha'=\alpha+\Delta\alpha$ is a modified azimuth angle, and the second attitude angle includes the modified pitch angle and the modified azimuth angle.

Specifically, determining the position relationship between the observation object and the first predetermined object in the second image based on the second image. Then modifying the first attitude angle by using the second formula and based on the known first attitude angle for capturing the second image and the position relationship between the first predetermined object and the observation object in the second image, to obtain the second attitude angle. The second attitude angle represents an attitude angle at which the optical device captures the observation object when the observation object is in the center location of the image.

It should be noted that the second image captured by the optical device is a rectangular image. A vertical distance of the rectangular image is related to $\xi$, that is, $\xi$ represents an angle of field of view of the optical device in a vertical direction. A horizontal distance of the rectangular image is related to $\omega$, that is, $\omega$ represents an angle of field of view of the optical device in a horizontal direction.

Optionally, based on a location of a object in a known image, an attitude angle at which the optical device captures the object when the object is in a center location of the image may be calculated by using the second formula. That is, when the first predetermined object is not in the center of the image captured by the optical device, an attitude angle at which the optical device captures a first object when the first object is in the center location of the image, namely, the first attitude angle, may be calculated by using the second formula.

It should be noted that, before calculating the first attitude angle by using the second formula, a third image in which the first predetermined object is located in the center of the image is firstly captured. Then the first attitude angle for acquiring the second image is calculated by using the first calculation formula; and under the condition that the first attitude angle is kept unchanged, the first image including images of the first predetermined object and the observation object is captured. Then an attitude angle under the assumption that the first predetermined object is located at the center of the current image, namely, an assumed attitude angle, is calculated by using the second formula. The original first attitude angle is updated by the assumed attitude angle, and the assumed attitude angle is used as the first attitude angle for subsequent calculation.

In an optional embodiment, the step of calculating geographic coordinate of the observation object based on the second attitude angle includes: calculating the geographic coordinate of the observation object, based on the second attitude angle, by using the first formula.

Specifically, the geographic coordinate of the observation object is calculated, based on the known second attitude angle, by using the first formula that can represent the corresponding relationship between the geographic coordinate of the observation object and the second attitude angle.

Figure 2:
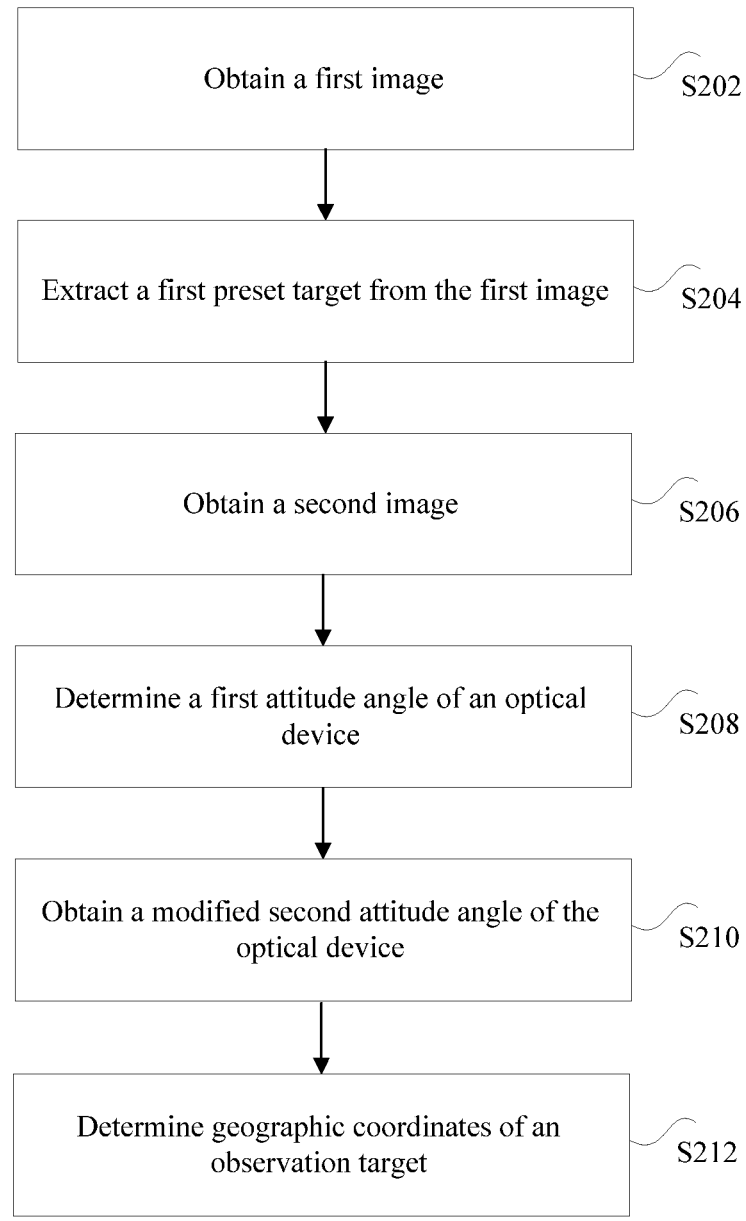
FIG. 2 is a flowchart of an optional positioning method according to an embodiment of the present invention.

FIG. 2 is a flowchart of an optional positioning method according to an embodiment of the present invention. As shown in FIG. 2, the positioning method includes the following steps:

Step S202: obtaining a first image.

Capturing an image on the observation ground by an optical device of a floating platform; comparing the captured image with an image database that stores images of an observation object and a predetermined object.

Determining whether the captured image includes images of the observation object and the predetermined object; if the captured image includes images of the observation object and the predetermined object, determining that the image captured by the optical device is the first image; or if the captured image does not include images of the observation object and the predetermined object, storing a current attitude of the optical device, increasing an angle of field of view, and reacquiring the image on the observation ground, until the captured image includes images of the observation object and the predetermined object.

The angle of field of view is the opening angle of the image coverage range relative to the camera in the current imaging state. For a zoom optical system of the optical device, if it is ensured that other optical parameters remain unchanged, an angle of field of view of the system changes only with adjustment of a local length.

It should be noted that the predetermined object is a reference point having known geographic coordinate that is set in advance and is adjacent to the observation object. The floating platform determines the predetermined image as a reference point, to improve the accuracy of positioning the observation object.

Optionally, in order to facilitate the optical device of the floating platform to capture the first image including images of the observation object and the predetermined object, a plurality of predetermined objects may be disposed in a target area that is adjacent to the observation object; the target area is a regular graphic area that is centered around the observation object. A range of the target area may be determined based on an angle of field of view at which the optical device of the floating platform captures the first image. If the angle of field of view of the optical device is large, the target area having a relatively large range is determined; or if the angle of field of view of the optical device is small, the target area having a relatively small range is determined. In addition, the predetermined objects disposed in the target area may be evenly arranged in the target area.

Optionally, in order to facilitate identifying the predetermined object in the first image, the predetermined object may be disposed in the target area at an open space or a higher ground position, such that the predetermined object is not covered and can be easily identified.

Step S204: extracting a first predetermined object from the first image.

Selecting a predetermined object from the first image and determining the predetermined object as the first predetermined object, determining a pixel location of the first predetermined object in the first image, so as to provide reference data for accurate positioning of the observation object subsequently.

Optionally, the first image includes images of the observation object and the predetermined object, wherein the predetermined object may be one or more. If there is one predetermined object in the first image, it is determined that the predetermined object is the first predetermined object; or if there are a plurality of predetermined objects in the first image, one of the predetermined objects may be selected as the first predetermined object.

In an alternative embodiment, the predetermined object closest to the observation object may be selected as the first predetermined object.

Optionally, determining distances between the observation object and the predetermined objects in the first image; and determining the predetermined object, having the shortest distance from the observation object, as the first predetermined object.

Step S206: obtaining a second image.

In the case of determining the first predetermined object, the optical device reacquires the first image in which the first predetermined object is located at the center of the image, and determines the reacquired first image as the second image.

Step S208: determining a first attitude angle of an optical device.

Establishing an accurate conversion matrix, that is, a first formula; based on a coordinate conversion principle and the measurement data obtained by an inertial navigation system of the floating platform. The first formula represents an attitude angle at which the optical device captures the second image, that is, a corresponding relationship between the first attitude angle and geographic coordinates of a center location of the second image. The first attitude angle may be determined by the geographic coordinate of a center position of the second image.

In an optional embodiment, the first formula may be $$A\begin{bmatrix} \cos\alpha\cos\beta \\ \sin\alpha\cos\beta \\ -\sin\beta \end{bmatrix} = B\begin{bmatrix} N\cos c\cos d \\ N\cos c\sin d \\ N(1-e^2)\sin c \end{bmatrix}.$$

In the formula, A and B represent preset rotation matrices that are determined based on the measurement data obtained by the inertial navigation system; c and d are the geographic coordinates of the center location of the second image, c represents a longitude coordinate, and d represents a latitude coordinate; α and β are first attitude angles at which the optical device captures the second image, α is an azimuth angle, and β is a pitch angle; e is calculated by using a formula $$e = \frac{\sqrt{a^2-b^2}}{a};$$

N is calculated by using a formula $$N = \frac{a}{\sqrt{(1-e^2 \times \sin^2 d)}};$$

a represents the longest radius of the earth and a=6378137 m; and b represents the shortest radius of the earth and b=6356752.3142 m.

Step S210: obtaining a modified second attitude angle of the optical device.

Calculating, based on the position relationship between the observation object and the first predetermined object, an attitude angle by using the second formula under an assumption that the observation object is located in the center of the second image; that is, the second attitude angle is obtained.

Optionally, the second formula may be $$\Delta\beta = \begin{cases} \frac{(h-540)}{1080}\xi \ldots h < 540 \\ 0 \ldots h = 540 or 541 \\ \frac{(h-541)}{1080}\xi \ldots h > 541 \end{cases} \text{ and } \Delta\alpha = \begin{cases} \frac{(l-960)}{1920}\omega \ldots l < 960 \\ 0 \ldots l = 960 or 961 \\ \frac{(l-961)}{1920}\omega \ldots l > 961 \end{cases}.$$

Because the first predetermined object is located at the center of the second image, the observation object may be modified based on the center location of the second image. h is a row number of pixels of the observation object in the second image, and l is a column number of pixels of the observation object in the second image; α and β are first attitude angles at which the optical device captures the second image, α is an azimuth angle, and β is a pitch angle; Δβ is a modified value of the pitch angle, and Δα is a modified value of the azimuth angle; ξ and ω are angles of field of view at which the optical device captures the second image, ξ represents the angle of field of view of the optical device in a vertical direction, and ω represents the angle of field of view of the optical device in a horizontal direction; and β'=β−Δβ is a modified pitch angle, α'=α+Δα is a modified azimuth angle, and the second attitude angle includes the modified pitch angle and the modified azimuth angle.

Step S212: determining geographic coordinate of the observation object.

Substituting the modified second attitude angle into the first formula, and determining that the geographic coordinate of the center position of the second image is the geographic coordinate of the observation object.

In the above embodiment, the floating platform is equipped with the optical device for ground monitoring. The geographic coordinate of the observation object can be determined at the same time of detection. In addition, the accuracy of the geographic coordinate of the determined observation object is high. This can improve functions of the floating platform in actual application.

Therefore, in the absence of the ranging module or the accurate attitude measuring module, the optical platform can effectively improve positioning accuracy of the observation object and reduce positioning cost by using the existing optical device and the existing inertial navigation system with limited ground control points.

Figure 3:
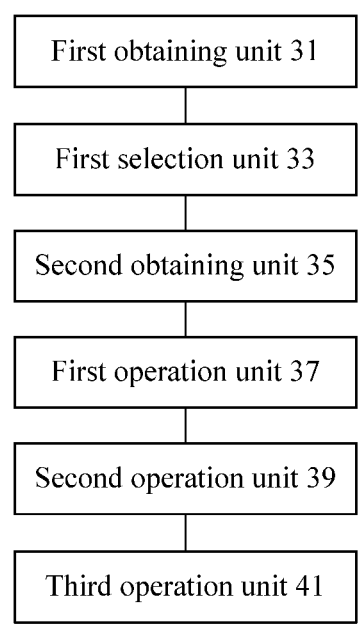
FIG. 3 is a schematic diagram of a positioning apparatus according to an embodiment of the present invention.

FIG. 3 is a schematic diagram of a positioning apparatus according to an embodiment of the present invention. As shown in FIG. 3, the positioning apparatus includes: a first acquiring unit 31, configured to acquire a first image captured by an optical device; wherein the first image includes images of an observation object and a plurality of predetermined objects, and the predetermined objects have known geographic coordinates; a first selection unit 33, configured to select a first predetermined object from the predetermined objects based on the first image; a second acquiring unit 35, acquire a second image, wherein the first predetermined object is located at the center of the second image; a first arithmetic unit 37, configured to determine a first attitude angle of the optical device based on measurement data obtained by an inertial navigation system and the first predetermined object in the second image; a second arithmetic unit 39, configured to modify the first attitude angle, based on a position relationship between the observation object and the first predetermined object in the second image, to obtain a second attitude angle; and a third arithmetic unit 41, configured to calculate the geographic coordinate of the observation object based on the second attitude angle.

In the above embodiment, the optical device mounted on the floating platform captures an image of the ground observation object, extracts an image, including the observation object and the predetermined objects that have known geographic coordinates, from the captured image; and determines the extracted image as a first image; then selects a predetermined object from the first image, determines the predetermined object as a reference object for accurately positioning the observation object subsequently, and names the reference object as the first predetermined object; then selects a second image from the first image, wherein the first predetermined object is located at the center of the second image; determines a first attitude angle at which the optical device captures the second image, based on known coordinates of the first predetermined object and measurement data obtained by the inertial navigation system of the floating platform; then modifies the first attitude angle, based on a position relationship between the observation object and the first predetermined object in the second image, to obtain a second attitude angle; and further calculates geographic coordinate of the observation object based on the modified second attitude angle, such that the floating platform can achieve accurate positioning the observation object based on the optical device of the floating platform, the inertial navigation system of the floating platform, and the predetermined object on the ground, without the need to additionally add a distance measuring module and an attitude measuring module to the floating platform so as to facilitate positioning the observation object, thereby solving the technical problem that the cost of accurately positioning the observation object are high in the prior art.

In an optional embodiment, the first acquiring unit includes a first acquiring module, configured to acquire the first image in a target area captured by the optical device; wherein the target area includes the observation object and the predetermined objects, and a range of the target area is determined according to an angle of field of view of the optical device.

In an optional embodiment, the first acquiring unit includes: a detection module, configured to detect whether an image captured by the optical device includes images of the observation object and the predetermined objects; a first detection sub-module, configured to increase an angle of field of view of the optical device and reacquire an image captured by the optical device if the image captured by the optical device does not include images of the observation object and the predetermined objects; and a second detection sub-module, configured to determine that the first image is captured if the image captured by the optical device includes images of the observation object and the predetermined objects.

In an optional embodiment, the detection module includes: a second acquiring module, configured to obtain a predetermined image database of the observation object and the predetermined objects, wherein the predetermined image database stores features of the observation object and the predetermined objects; a second detection module, configured to detect whether the image captured by the optical device includes the features of the observation object and the predetermined objects; and a third detection sub-module, configured to determine that the image captured by the optical device includes images of the observation object and the predetermined objects if it is detected that the image captured by the optical device includes the features of the observation object and the predetermined objects.

In an optional embodiment, the first selection unit is specifically configured to: determine distances between the observation object and the predetermined objects in the first image; and determine a predetermined object, having the shortest distance from the observation object, as the first predetermined object.

In an optional embodiment, the first arithmetic unit is specifically configured to: calculate, by using a first formula, the first attitude angle of the optical device based on measurement data obtained by an inertial navigation system and the first predetermined object in the second image, where the first formula is $$A \begin{bmatrix} \cos\alpha\cos\beta \\ \sin\alpha\cos\beta \\ -\sin\beta \end{bmatrix} = B \begin{bmatrix} N\cos c \cos d \\ N\cos c \sin d \\ N(1-e^2)\sin c \end{bmatrix},$$

where A and B represent preset rotation matrices and are determined based on the measurement data obtained by the inertial navigation system; c and d are geographic coordinates of the center location of the second image, c represents a longitude coordinate, and d represents a latitude coordinate; $\alpha$ and $\beta$ are first attitude angles at which the optical device captures the second image, $\alpha$ is an azimuth angle, and $\beta$ is a pitch angle; and $$e = \frac{\sqrt{a^2 - b^2}}{a} \text{ and } N = \frac{a}{\sqrt{(1 - e^2 \times \sin^2 d)}},$$

where a represents the longest radius of the earth, and b represents the shortest radius of the earth.

In an optional embodiment, the second arithmetic unit is specifically configured to modify, by using a second formula, the first attitude angle based on the position relationship between the observation object and the first predetermined object in the second image, to obtain the second attitude angle, where the second formula is $$\Delta\beta = \begin{cases} \frac{(h-540)}{1080}\xi \dots h < 540 \\ 0 \dots h = 540 or 541 \\ \frac{(h-541)}{1080}\xi \dots h > 541 \end{cases} \text{ and } \Delta\alpha = \begin{cases} \frac{(l-960)}{1920}\omega \dots l < 960 \\ 0 \dots l = 960 or 961 \\ \frac{(l-961)}{1920}\omega \dots l > 961 \end{cases};$$

where h is a row number of pixels of the observation object in the second image, and l is a column number of pixels of the observation object in the second image; α and β are first attitude angles at which the optical device captures the second image, α is an azimuth angle, and β is a pitch angle; Δβ is a modified value of the pitch angle, and Δα is a modified value of the azimuth angle; ξ and ω are angles of field of view at which the optical device captures the second image, ξ represents the angle of field of view of the optical device in a vertical direction, and ω represents the angle of field of view of the optical device in a horizontal direction; and β'=β−Δβ is a modified pitch angle, α'=α+Δα is a modified azimuth angle, and the second attitude angle includes the modified pitch angle and the modified azimuth angle.

Sequence numbers of the above embodiments of the present invention are merely used for description, and do not represent superiority or inferiority of the embodiments.

In the above embodiments of the present invention, descriptions of the embodiments have respective emphases. For a part not described in detail in an embodiment, reference may be made to related descriptions in another embodiment.

In the several embodiments provided in this application, it should be understood that the disclosed technical content may be implemented in other manners. The described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the units or modules may be implemented in electrical or other forms.

The units described as separate parts may or may not be physically separated, and parts shown as units may or may not be physical units, may be located in one position, or may be distributed on a plurality of units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a read-only memory (ROM, Read-Only Memory), a random access memory (RAM, Random Access Memory), a removable hard disk, a magnetic disk, or an optical disc.

The foregoing descriptions are merely preferred implementations of the present invention. It should be noted that, improvements and modifications may be further made by a person of ordinary skill in the art without departing from the principles of the present invention, and these improvements and modifications shall also be construed as falling within the protection scope of the present invention.

What is claimed:

1. A positioning method, comprising:
   acquiring a first image captured by an optical device; the first image comprising images of a ground observation object and a plurality of predetermined objects, and the predetermined objects having known geographic coordinates;
   selecting a first predetermined object from the predetermined objects based on the first image;
   acquiring a second image; the first predetermined object being located at the center of the second image;
   determining a first attitude angle of the optical device based on measurement data obtained by an inertial navigation system and the first predetermined object in the second image;
   modifying the first attitude angle, based on a position relationship between the ground observation object and the first predetermined object in the second image, to obtain a second attitude angle;
   calculating a geographic coordinate of the ground observation object based on the second attitude angle, wherein the geographic coordinate comprises a longitude coordinate and a latitude coordinate.

2. The positioning method according to claim 1, wherein the step of acquiring a first image captured by an optical device comprises:
   acquiring the first image in a target area captured by the optical device; the target area comprising the ground observation object and the predetermined objects, and a range of the target area being determined according to an angle of field of view of the optical device.

3. The positioning method according to claim 1, wherein the step of acquiring a first image captured by an optical device comprises:
   detecting whether an image, captured by the optical device, comprises images of the ground observation object and the predetermined objects;

increasing an angle of field of view of the optical device and reacquiring the image captured by the optical device if the image captured by the optical device does not comprise images of the ground observation object and the predetermined objects;

determining that the first image is captured if the image captured by the optical device comprises images of the ground observation object and the predetermined objects.

4. The positioning method according to claim 3, wherein the step of detecting whether an image captured by the optical device comprises images of the ground observation object and the predetermined objects comprises:

obtaining a predetermined image database of the ground observation object and the predetermined objects, the predetermined image database storing features of the ground observation object and the predetermined objects;

detecting whether the image captured by the optical device comprises the features of the ground observation object and the predetermined objects; and determining that the image captured by the optical device comprises images of the ground observation object and the predetermined objects if it is detected that the image captured by the optical device comprises the features of the ground observation object and the predetermined objects.

5. The positioning method according to claim 1, wherein the step of selecting a first predetermined object from the predetermined objects based on the first image comprises:

determining distances between the ground observation object and the predetermined objects in the first image; and determining the predetermined object, having the shortest distance from the ground observation object, as the first predetermined object.

6. The positioning method according to claim 1, wherein the step of determining a first attitude angle of the optical device based on measurement data obtained by an inertial navigation system and the first predetermined object in the second image comprises:

calculating the first attitude angle of the optical device, based on the measurement data obtained by the inertial navigation system and the first predetermined object in the second image, by using a first formula; wherein the first formula is $$A \begin{bmatrix} \cos\alpha\cos\beta \\ \sin\alpha\cos\beta \\ -\sin\beta \end{bmatrix} = B \begin{bmatrix} N\cos c \cos d \\ N\cos c \sin d \\ N(1-e^2)\sin c \end{bmatrix};$$

wherein A and B represent preset rotation matrices that are determined based on the measurement data obtained by the inertial navigation system;

c and d are geographic coordinates of the center location of the second image, c represents a longitude coordinate, and d represents a latitude coordinate;

$\alpha$ and $\beta$ are first attitude angles at which the optical device captures the second image, $\alpha$ is an azimuth angle, and $\beta$ is a pitch angle; and $$e = \frac{\sqrt{a^2 - b^2}}{a} \text{ and } N = \frac{a}{\sqrt{(1 - e^2 \times \sin^2 d)}},$$

wherein a represents the longest radius of the earth, and b represents the shortest radius of the earth.

7. The positioning method according to claim 1, wherein the step of modifying the first attitude angle, based on a position relationship between the ground observation object and the first predetermined object in the second image, to obtain a second attitude angle comprises:

modifying the first attitude angle, based on the position relationship between the ground observation object and the first predetermined object in the second image, by using a second formula to obtain the second attitude angle; wherein the second formula is $$\Delta\beta = \begin{cases} \frac{(h-540)}{1080}\xi \ldots h < 540 \\ 0 \ldots h = 540 \text{ or } 541 \\ \frac{(h-541)}{1080}\xi \ldots h > 541 \end{cases} \text{ and } \Delta\alpha = \begin{cases} \frac{(l-960)}{1920}\omega \ldots l < 960 \\ 0 \ldots l = 960 \text{ or } 961 \\ \frac{(l-961)}{1920}\omega \ldots l > 961 \end{cases};$$

wherein h is a row number of pixels of the ground observation object in the second image, and l is a column number of pixels of the ground observation object in the second image;

$\alpha$ and $\beta$ are the first attitude angles at which the optical device captures the second image, $\alpha$ is an azimuth angle, and $\beta$ is a pitch angle;

$\Delta\beta$ is a modified value of the pitch angle, and $\Delta\alpha$ is a modified value of the azimuth angle;

$\xi$ and $\omega$ are angles of field of view at which the optical device captures the second image, $\xi$ represents the angle of field of view of the optical device in a vertical direction, and $\omega$ represents the angle of field of view of the optical device in a horizontal direction; and $\beta'=\beta-\Delta\beta$ represents a modified pitch angle, $\alpha'=\alpha+\Delta\alpha$ represents a modified azimuth angle, and the second attitude angle comprises the modified pitch angle and the modified azimuth angle.

8. A positioning apparatus, comprising:

a first acquiring unit, configured to acquire a first image captured by an optical device; wherein the first image comprises images of a ground observation object and a plurality of predetermined objects, and the predetermined objects have known geographic coordinates;

a first selection unit, configured to select a first predetermined object from the predetermined objects based on the first image;

a second acquiring unit, configured to acquire a second image, wherein the first predetermined object is located at the center of the second image;

a first arithmetic unit, configured to determine a first attitude angle of the optical device based on measurement data obtained by an inertial navigation system and the first predetermined object in the second image;

a second arithmetic unit, configured to modify the first attitude angle, based on a position relationship between the ground observation object and the first predetermined object in the second image, to obtain a second attitude angle; and a third arithmetic unit, configured to calculate a geographic coordinate of the ground observation object based on the second attitude angle, wherein the geographic coordinate comprises a longitude coordinate and a latitude coordinate.

9. The positioning apparatus according to claim 8, wherein the first acquiring unit comprises:

a first acquiring module, configured to acquire the first image in a target area captured by the optical device; wherein the target area comprises the ground observation object and the predetermined objects, and a range of the target area is determined according to an angle of field of view of the optical device.

10. The positioning apparatus according to claim 8, wherein the first acquiring unit comprises:
a detection module, configured to detect whether an image captured by the optical device comprises images of the ground observation object and the predetermined objects;
a first detection sub-module, configured to increase an angle of field of view of the optical device and reacquire the image captured by the optical device if the image captured by the optical device does not comprise images of the ground observation object and the predetermined objects; and
a second detection sub-module, configured to determine that the first image is captured if the image captured by the optical device comprises images of the ground observation object and the predetermined objects.

11. The positioning apparatus according to claim 10, wherein the detection module comprises:
a second acquiring module, configured to obtain a predetermined image database of the ground observation object and the predetermined objects, wherein the predetermined image database stores features of the ground observation object and the predetermined objects;
a second detection module, configured to detect whether the image captured by the optical device comprises the features of the ground observation object and the predetermined objects; and
a third detection sub-module, configured to determine that the image captured by the optical device comprises images of the ground observation object and the predetermined objects if it is detected that the image captured by the optical device comprises the features of the ground observation object and the predetermined objects.

12. The positioning apparatus according to claim 8, wherein the first selection unit is specifically configured to:
determine distances between the ground observation object and the predetermined objects in the first image; and
determine a predetermined object, having the shortest distance from the ground observation object, as the first predetermined object.

13. The positioning apparatus according to claim 8, wherein the first arithmetic unit is specifically configured to:
calculate the first attitude angle of the optical device, based on the measurement data obtained by the inertial navigation system and the first predetermined object in the second image, by using a first formula; wherein the first formula is $$A\begin{bmatrix} \cos\alpha\cos\beta \\ \sin\alpha\cos\beta \\ -\sin\beta \end{bmatrix} = B\begin{bmatrix} N\cos c\cos d \\ N\cos c\sin d \\ N(1-e^2)\sin c \end{bmatrix};$$

wherein A and B represent preset rotation matrices that are determined based on the measurement data obtained by the inertial navigation system;

c and d are geographic coordinates of the center location of the second image, c represents a longitude coordinate, and d represents a latitude coordinate;
α and β are first attitude angles at which the optical device captures the second image, α is an azimuth angle, and β is a pitch angle; and $$e = \frac{\sqrt{a^2 - b^2}}{a} \text{ and } N = \frac{a}{\sqrt{(1 - e^2 \times \sin^2 d)}},$$

wherein a represents the longest radius of the earth, and b represents the shortest radius of the earth.

14. The positioning apparatus according to claim 8, wherein the second arithmetic unit is specifically configured to:
modify the first attitude angle, based on the position relationship between the ground observation object and the first predetermined object in the second image, by using a second formula to obtain the second attitude angle; wherein the second formula is $$\Delta\beta = \begin{cases} \frac{(h-540)}{1080}\xi \ldots h < 540 \\ 0 \ldots h = 540 or 541 \\ \frac{(h-541)}{1080}\xi \ldots h > 541 \end{cases} \text{ and } \Delta\alpha = \begin{cases} \frac{(l-960)}{1920}\omega \ldots l < 960 \\ 0 \ldots l = 960 or 961 \\ \frac{(l-961)}{1920}\omega \ldots l > 961 \end{cases};$$

wherein h is a row number of pixels of the ground observation object in the second image, and l is a column number of pixels of the ground observation object in the second image;
α and β are the first attitude angles at which the optical device captures the second image, α is an azimuth angle, and β is a pitch angle;
Δβ is a modified value of the pitch angle, and Δα is a modified value of the azimuth angle;
ξ and ω are angles of field of view at which the optical device that captures the second image, ξ represents the angle of field of view of the optical device in a vertical direction, and ω represents the angle of field of view of the optical device in a horizontal direction; and
β'=β−Δβ represents a modified pitch angle, α'=α+Δα represents a modified azimuth angle, and the second attitude angle comprises the modified pitch angle and the modified azimuth angle.

15. A floating platform, comprising an optical device and an inertial navigation system, wherein the floating platform is configured for:
acquiring a first image captured by the optical device; the first image comprising images of a ground observation object and a plurality of predetermined objects, and the predetermined objects having known geographic coordinates;
selecting a first predetermined object from the predetermined objects based on the first image;
acquiring a second image; the first predetermined object being located at the center of the second image;
determining a first attitude angle of the optical device based on measurement data obtained by the inertial navigation system and the first predetermined object in the second image;
modifying the first attitude angle, based on a position relationship between the ground observation object and the first predetermined object in the second image, to obtain a second attitude angle;

calculating a geographic coordinate of the ground observation object based on the second attitude angle, wherein the geographic coordinate comprises a longitude coordinate and a latitude coordinate.

16. The floating platform according to claim 15, wherein the floating platform is specifically configured for:

acquiring the first image in a target area captured by the optical device; the target area comprising the ground observation object and the predetermined objects, and a range of the target area being determined according to an angle of field of view of the optical device.

17. The floating platform according to claim 15, wherein the floating platform is specifically configured for:

detecting whether an image, captured by the optical device, comprises images of the ground observation object and the predetermined objects;

increasing an angle of field of view of the optical device and reacquiring the image captured by the optical device if the image captured by the optical device does not comprise images of the ground observation object and the predetermined objects;

determining that the first image is captured if the image captured by the optical device comprises images of the ground observation object and the predetermined objects.

18. The floating platform according to claim 17, wherein the floating platform is specifically configured for:

obtaining a predetermined image database of the ground observation object and the predetermined objects, the predetermined image database storing features of the ground observation object and the predetermined objects;

detecting whether the image captured by the optical device comprises the features of the ground observation object and the predetermined objects; and determining that the image captured by the optical device comprises images of the ground observation object and the predetermined objects if it is detected that the image captured by the optical device comprises the features of the ground observation object and the predetermined objects.

19. The floating platform according to claim 15, wherein the floating platform is specifically configured for:

determining distances between the ground observation object and the predetermined objects in the first image; and determining the predetermined object, having the shortest distance from the ground observation object, as the first predetermined object.

20. The floating platform according to claim 15, wherein the floating platform is specifically configured for:

calculating the first attitude angle of the optical device, based on the measurement data obtained by the inertial navigation system and the first predetermined object in the second image, by using a first formula; wherein the first formula is $$A \begin{bmatrix} \cos\alpha\cos\beta \\ \sin\alpha\cos\beta \\ -\sin\beta \end{bmatrix} = B \begin{bmatrix} N\cos c \cos d \\ N\cos c \sin d \\ N(1-e^2)\sin c \end{bmatrix};$$

wherein A and B represent preset rotation matrices that are determined based on the measurement data obtained by the inertial navigation system;

c and d are geographic coordinates of the center location of the second image, c represents a longitude coordinate, and d represents a latitude coordinate;

α and β are the first attitude angles at which the optical device captures the second image, α is an azimuth angle, and β is a pitch angle; and $$e = \frac{\sqrt{a^2 - b^2}}{a} \text{ and } N = \frac{a}{\sqrt{(1 - e^2 \times \sin^2 d)}},$$

wherein a represents the longest radius of the earth, and b represents the shortest radius of the earth.

* * * * *